United States Patent [19]
Borgren

[11] 4,363,564
[45] Dec. 14, 1982

[54] WATER POWER GENERATOR

[75] Inventor: Peter M. Borgren, Duluth, Minn.

[73] Assignee: Hydrodynamic Energy Systems Corporation, Superior, Wis.

[21] Appl. No.: 185,486

[22] Filed: Sep. 9, 1980

[51] Int. Cl.³ .............................................. E02B 9/08
[52] U.S. Cl. ...................................... 405/77; 290/53
[58] Field of Search ............................. 405/31, 75–78; 60/398; 290/42, 53; 415/2 R, 7

[56] References Cited

U.S. PATENT DOCUMENTS

| | | | |
|---|---|---|---|
| 1,375,232 | 4/1921 | Rush | 405/31 |
| 2,641,108 | 6/1953 | Montgomery et al. | 405/76 |
| 4,034,231 | 7/1977 | Conn et al. | 290/53 |
| 4,105,362 | 8/1978 | Sforza | 415/2 |
| 4,111,594 | 9/1978 | Sforza | 415/1 |
| 4,172,689 | 10/1979 | Thorsheim | 415/7 |

FOREIGN PATENT DOCUMENTS 1015119  12/1965  United Kingdom .

*Primary Examiner*—David H. Corbin
*Attorney, Agent, or Firm*—Schwartz, Jeffery, Schwaab, Mack, Blumenthal & Koch

[57] ABSTRACT

A water power generator for generating electrical energy from a moving body of water comprising structural means interposed in the path of water flow. The structural means includes at least one side wall which is longitudinally curved from a diverting point at the outer end thereof to a gradually flattened curve at the inner end thereof. The wall is transversely curved from a generally planar surface at the outer end thereof to a curvature approaching circular at the inner end thereof. Cowling means is positioned at the inner end of the side wall, and turbine generator means is located at the outer end of said cowling means. In certain forms of the invention, two or more longitudinally and transversely curved side walls are provided, each having an associated cowling and turbine generator. The invention is adaptable to wave action, tidal action and river current environments.

14 Claims, 9 Drawing Figures

WATER POWER GENERATOR

BACKGROUND OF THE INVENTION

The present invention relates as indicated to a water power generator, and relates more particularly to a system for generating electric power through the utilization of wave action forces, tides, and bodies of water having uni-directional flow such as rivers.

Wave action generators for producing electric energy are well known in the art. Such generators operate on the principle of using the vertical motion inherent in the formation and movement of the waves to effect vertical movement of a component of the generating system. A typical prior art system translates such vertical movement to rotary movement to directly or indirectly drive a generator shaft or the like by means of which the electric power is generated. Other systems use the vertical wave motion to operate pumps for pumping the water to a storage vessel or reservoir, with the hydrostatic pressure of the stored water subsequently driving a turbine generator or the like by means of which electric power is directly produced. Examples of vertical-to-rotary systems are disclosed in U.S. Pat. No. 870,706 to H. P. Woodard, U.S. Pat. No. 3,894,241 to S. Kaplan, and U.S. Pat. No. 3,959,663 to J. V. Rusby.

A major difficulty with wave action generating systems known in the prior art is their relatively complex and consequently costly construction. As a result, the necessary capital investment in systems of this type has been a substantial detriment to the commercial employment of the systems, particularly where the energy output does not justify the installation costs. It will be noted in this regard that systems must be designed to withstand and satisfactorily handle wave swells at their greatest peak, and must also be constructed to accommodate and satisfactorily handle, on an economic basis, waves of normal or less than normal height. Installations in saline water conditions present the additional problem of corrosive conditions, which has not been satisfactorily dealt with in prior art systems.

In copending application Ser. No. 127,990, filed Mar. 7, 1980, entitled "Wave Action Generating System", in the names of Peter M. Borgren and Albert J. Amatuzio, there is disclosed a wave action generating system which employs a supporting structure, such as a coffer dam or silo-like structure, mounted relative to a body of water so as to separate the same into a relatively shallow reservoir confined by the support means and the open body of water at normal water level and subjected to wave action. The difference in water levels between the reservoir and the open body of water creates a controllable hydrostatic pressure head. A plurality of pump assemblies are mounted around the silo or along the walls of the coffer dam, with the piston of each pump being operatively connected to a float member subjected to wave action. As wave forces contact the float members, the same are raised, thereby raising the piston and creating a negative pressure within the lower pump chamber, as a result of which water is directed from the reservoir into such lower pump chambers. As a result, the water level of the reservoir is reduced. Due to the hydrostatic pressure thus produced relative to the water surrounding the silo or coffer dam, water is forced through turbine generators to produce energy, with the water exhausted from the turbine entering the reservoir to complete the cycle. As disclosed in such earlier application, a significant amount of electrical energy can be produced.

Although the system briefly described above and described in detail in the noted pending application is of substantial importance to the art of wave action generating systems, it is essentially limited in utility to conditions where substantial wave action activity is encountered. It is not adaptable to tidal conditions where wave action is minimal, nor can the system be utilized where water is uni-directional in flow, such as rivers, where wave action does not exist.

With regard to tide action generators, the basic concept of utilizing differences in water level due to tide conditions to create electrical energy is well known in the art. Extensive research has been conducted in this area for many years due to the consistency of the tidal movements and the differential in high and low tides at particular locations. However, tidal generators have also comprised, for the most part, structure or devices by which the vertical water drop is translated into rotary motion to drive power generating equipment.

Likewise, energy associated with uni-directional water flow has also been used for power generating systems. Dams of course come readily to mind, with the water flow in that instance being subjected to vertical drop which is used for energy production.

SUMMARY OF THE INVENTION

A principal feature of the concepts of the present invention is the adaptability of the invention to environments where wave action, tidal action or uni-directional water flow to an appreciable extent exists, or combinations of these water forces. It will be understood that in each of these environments a particular installation system is preferred, although in each instance the results achieved are based on the same scientific premise. Specifically, in each instance water is diverted along a curved path at the end of which is a cowling of reduced diameter toward the outlet end thereof, with such outlet end directly communicating with a turbine by means of which electrical energy is produced. Not only is such path longitudinally curved, but the surface against which the water impinges is transversely curved in progressively greater amounts as it approaches the cowling thereby effecting a swirling action which increases the velocity of the water. Such increased velocity is of course translatable directly into force, in accordance with well established scientific principals.

As above noted, various forms of the invention are specifically adaptable to varying water conditions. Where wave action is the water source from which the power is derived, a generally V-shaped structure is arranged at the appropriate location from the shore, with the apex of the V extending outwardly. As is well known, in wave environments, the motion of the water is confined essentially to the depth of the wave, and the waves will be split by the apex of the V for passage along the sides of the structure. As above noted, the sides are both longitudinally and transversely curved, and as a result there is a substantial increase in velocity of the water as it passes along the curved wall. Adjacent the inner end of each wall is positioned a cowling the outer end of which is shaped generally complimentary to the shape of the wall immediately adjacent the entry end of the cowling. The cowling is tapered inwardly toward its discharge end at which is positioned the turbine to be driven by the water. The cowling can be a separately formed member, or the side wall can be shaped to provide a generally circular, inwardly tapering opening through which the water, at high velocity, passes into the turbine. It has been imperically determined that the velocity of the water passing through the cowling and into the turbine is approximately 30 feet per second.

Where the invention is employed in tidal action environments, the basic principles are the same as above described. However, a second generally V-shaped structure either separate from or integral with the first is positioned downstream of the first to take advantage of the return tide. Thus, an additional pair of curved side walls leading to an apex are arranged, with the return tide flow being directed to separate cowlings located at the end of the longitudinally and transversely curved walls and communicating at their outer ends with generating turbines.

The invention is adapted for use in river conditions by providing a single longitudinally and transversely curved wall surface at the end of which is positioned the turbine generator as above described. In a river environment, the water flow is simply split, with a portion of the flow continuing downstream, and the other portion being directed along the curved wall surface, with the water discharged from the turbine likewise being directed downstream.

There are of course circumstances where both river and tidal currents exist, and in a further form of the invention, the structure is modified to increase, in both directions, the velocity of the water as it approaches the structure. If desired, the side walls and turbines subjected to water flow in one direction can be vertically staggered relative to the side walls and turbines of the side walls subjected to water flow in the opposite direction. In this manner, conservation of space is provided.

In order to prevent debris from entering the turbine generators, the directional cowling is preferably provided with grids or filters at appropriate locations therealong thereby to provide a reasonably clean flow of water to the turbines.

These and other objects of the invention will become apparent as the following description proceeds and particular reference to the application drawings.

BRIEF DESCRIPTION OF THE APPLICATION DRAWINGS

DETAILED DESCRIPTION OF THE PREFERRED EMBODIMENTS

Figure 1:
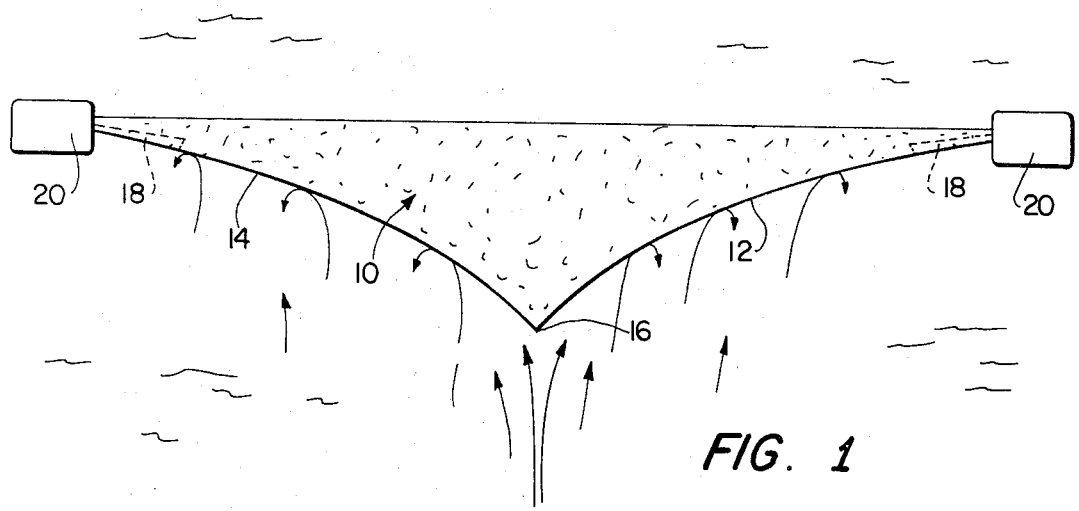
FIG. 1 is a top plan view of a water power generator particularly designed for wave action environment.
Figure 5:
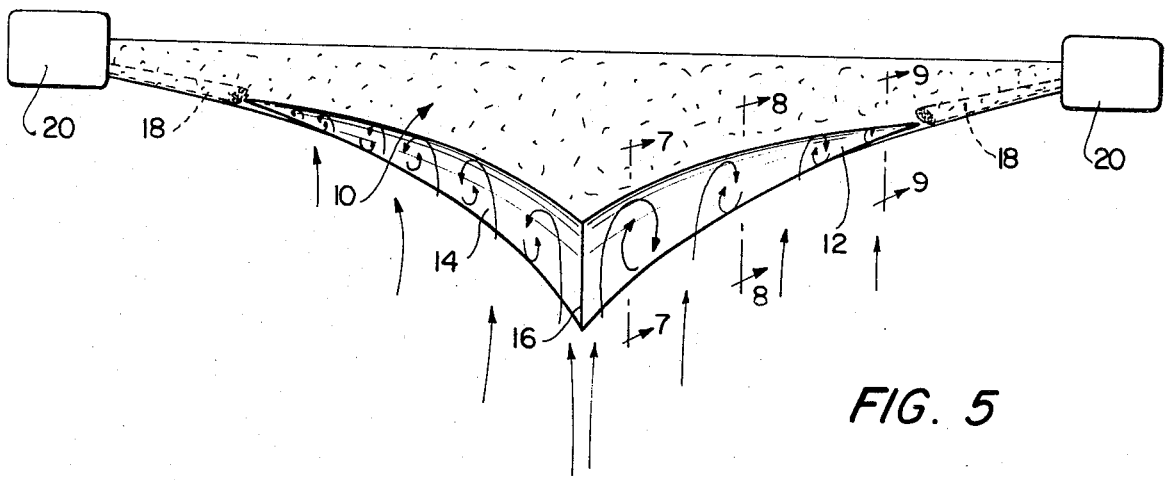
FIG. 5 is a partially diagrammatic perspective view of the FIG. 1 form of the invention, showing more clearly the curvature and configuration of the side walls of the structure.

Referring now to the application drawings, wherein like parts are indicated by like reference numerals, and initially to FIGS. 1 and 5, there is illustrated therein a structural body generally indicated at 10 which is permanently installed relatively close to shore. The FIG. 1 form of the invention is particularly adaptable to environments where wave action forces are encountered, and the structure 10 can be mounted permanently at the desired location in terms of distance from the shore and depth of water so as to expose the side walls thereof to maximum wave action forces. The structure 10 can be formed of any suitable material, for example, poured concrete, structural steel either covered or systematized to prevent corrosion, or combinations of these materials, or other suitable building materials. Likewise, the surface of the structure, including the surface of the side walls to be presently described, can be coated if desired to reduce building costs and prolong the life of the structure or, in the case of the side walls, to reduce the friction of the water passing therealong.

The structure 10 as shown in FIG. 1 includes two longitudinally and transversely curved side walls 12 and 14, the outer adjacent ends of which merge into an apex 16. At the end of each wall is a cowling means commonly designated at 18 and diagrammatically shown in FIG. 1. The outlet end of each cowling member communicates with a turbine generator 20 by means of which electrical energy is produced from the power of the water passing along the side walls.

The arrows in FIG. 1 illustrate the path of diversion of the water as it approaches the structure 10. The wave directly engaging the side walls 12 and 14 will continue therealong as will be presently described with reference to FIG. 5, and the wave contacting the structure in the region of the apex 16 will be split, passing to either one or the other of the side walls. It will be noted that the structure 10 is intended to capture the force of the wave action only insofar as the wave action contacts the side walls of the structure, with the structure not being intended to confine or in any way inhibit waves passing to either side of the structure.

The turbine per se forms no part of the present invention, with any satisfactory generator being capable of use for the purpose intended. Examples of turbine constructions which can be used satisfactorily in accordance with the present invention are the "TURE turbine units" manufactured by the Hydro-Turbine Division of Allis-Chalmers, York, Pa. and turbine pumps manufactured by Johnston Pump Company, Glendora, Calif., with turbine pump Nos. 27CC and 27DC being exemplary. The latter have impellers which are approximately 19"–21" in diameter, and are particularly adaptable to use in relative shallow wave action environments. It will be understood that turbines of larger impeller diameter can also be used, depending upon the environmental conditions.

Figure 7:
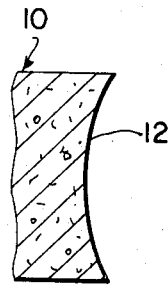
FIG. 7 is a cross-sectional view taken on lines 7—7 of FIG. 5 and showing the transverse curvature of the side wall at the section line.
Figure 8:
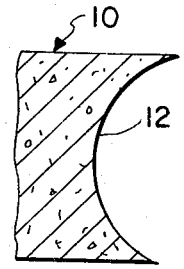
FIG. 8 is a sectional view taken on line 8—8 of FIG. 5.
Figure 9:
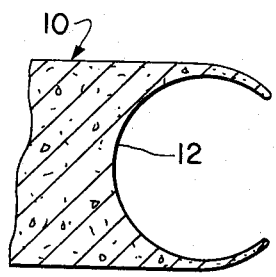
FIG. 9 is a sectional view taken on line 9—9 of FIG. 5.

Referring to FIG. 5, there is diagrammatically illustrated therein in perspective view a more clear illustration of the longitudinal and transverse curvature of the side walls 12 and 14, respectively. The cowling 18 located at the inner ends of each side wall is shown positioned within the inner end of the side walls, with each cowling communicating at its inner end with a turbine 20. It will be noted that the side walls are longitudinally curved from the apex toward the turbine, with the angle of inclination adjacent each turbine being relatively flat, that is, approaching a plane generally perpendicular to the path of movement of the wave. Each wall 12 and 14 relatively adjacent the apex 16 is essentially planer, with transverse curvature increasing toward the turbine end of the wall. The manner in which the side walls are progressively transversely curved is shown in cross sections in FIGS. 7, 8 and 9, and, as noted in FIG. 6, the side walls are essentially of closed circular cross section immediately in front of the cowling member 18. As a result of the longitudinal and transverse curvature, the water in the form of relatively rapidly moving waves gradually increases velocity as it travels along each side wall, due to both the vertical and horizontal wave forces. It is rudimentary that water reaching the turbine 20 will take the same amount of time as water passing directly unimpeded to the shore, thereby resulting in the increase in speed or velocity of the water as it passes along each curved wall. Thus, both the kinetic and potential energy from the vertical and horizontal wave forces are utilized. The longitudinal curvature is continuous, as above noted, and the transverse curvature is increasingly more pronounced, as noted in FIGS. 7-9. This transverse and longitudinal curvature results in a rapid rollover of the water as it passes along the side walls, as shown in arrows located along each side wall 12 and 14.

Figure 6:
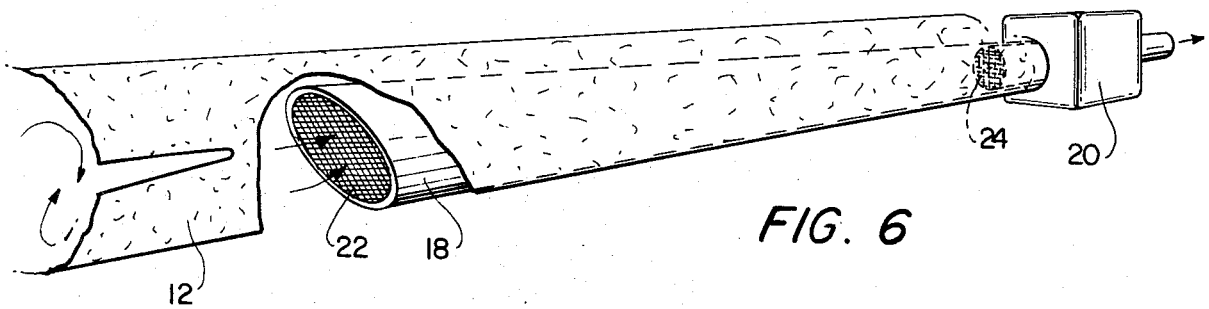
FIG. 6 is a fragmentary front elevational view showing in more detail the directional cowling mounted at the end of the side wall adjacent the turbine generator.

Referring to FIG. 6, the cowling member 18 is shown therein on a somewhat larger scale. The member preferably is a separate member and positioned within the closed, tapered end of the side wall. The cowling tapers in diameter from the outer end thereof to the inner end thereof, and filters 22 and 24 are preferably provided at the inlet and outlet ends of the cowling. Depending upon the shape of the closed inner end of each wall, the cross-sectional configuration of the cowling will vary, but in the form shown, the cowling is generally circular in cross section, tapering from a larger to a small diameter as shown. The filter members 22 and 24 are for the purpose of removing debris or the like from the water, prior to passage of the same into the turbine generator, which is diagrammatically shown both in FIGS. 5 and 6.

Although the cowling 18 is shown as a separate member in FIGS. 1, 5 and 6, it will be apparent that the innermost end of each side wall can be configured to provide a tapered opening similar in shape to the cowling member 18. This would avoid the need for a separate member, although filter means would preferably still be employed for the indicated purpose. As shown, the cowling member is encased within the inner end of the wall, although total encasement would not be absolutely necessary. The closing of the side wall at the inner end thereof, or the provision of a separate cowling, or both, is dictated by the need for retention of the swirling water passing along each side wall, and as long as a substantial amount of the water is retained for turbine generating purposes, it is sufficient.

As above noted, the side walls 12, along with the structure 10, can be formed of any suitable material, with concrete being one example. In order to reduce the friction of the water passing along the wall, the surfaces of the walls can be coated with a friction-reducing material, such as fiberglass or the like. It will be noted in this regard that the horizontal forces of the wave directly impinging upon the side walls between the apex and the turbine will be deflected in the direction of curvature of the walls whereby considerable frictional forces result. The provision of a friction-reducing surface would reduce such frictional forces to the extent possible, thereby maximizing the horizontal wave forces directed along the curved side walls.

Figure 2:
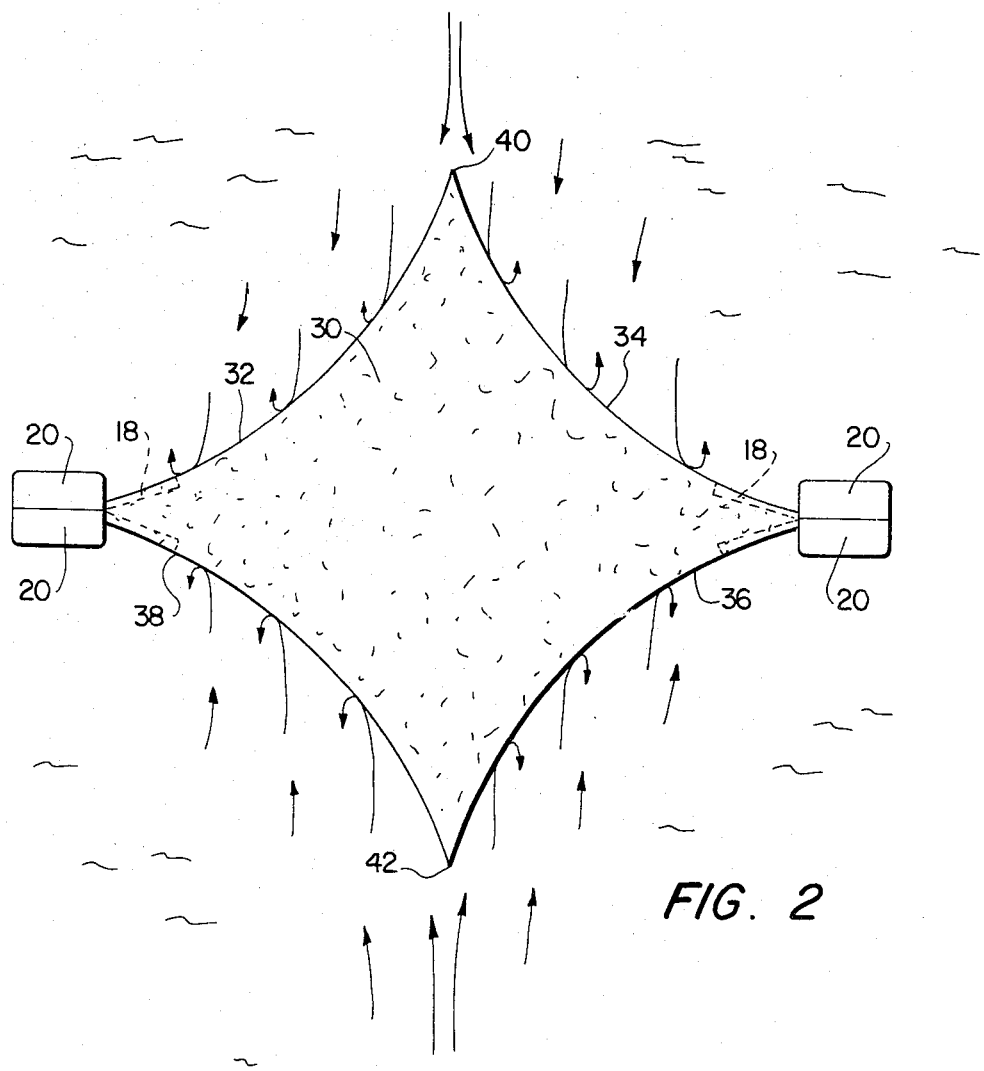
FIG. 2 is a water power generator specifically designed for tide water environment.
Figure 3:
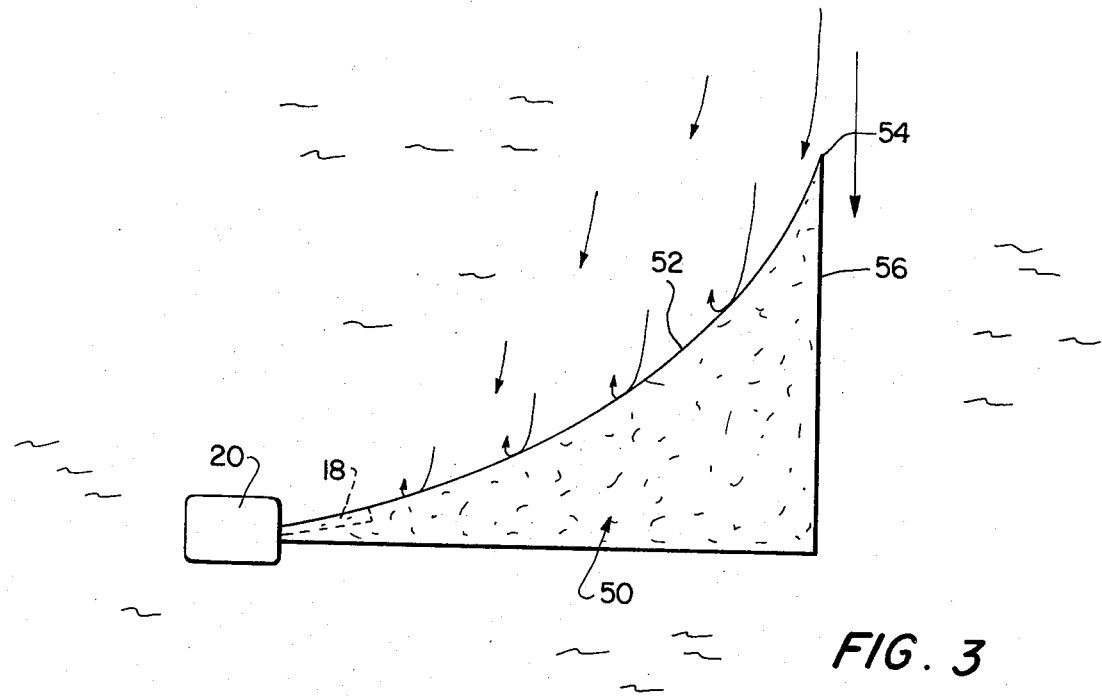
FIG. 3 is a water power generator especially designed for uni-directional water flow conditions such as rivers.
Figure 4:
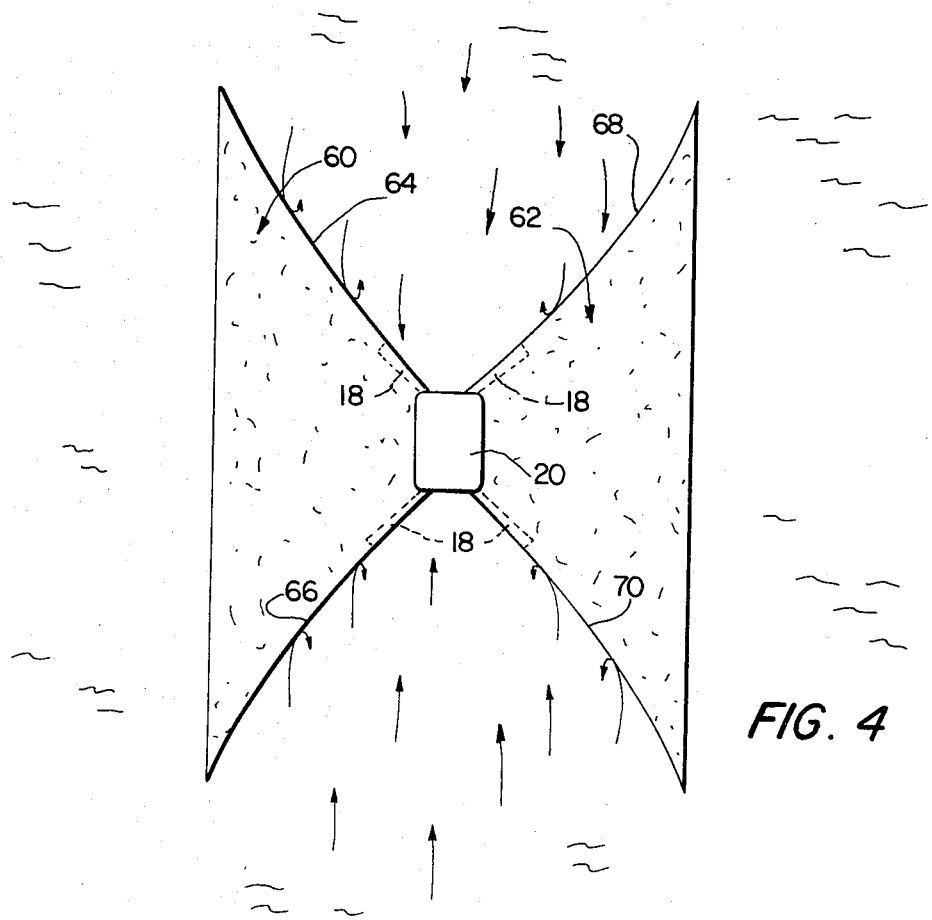
FIG. 4 is a top plan view of a further form of the invention, particularly designed for river conditions where tidal action exists.

As noted, FIG. 1 is specifically designed for a wave action environment, although the general concepts of the present invention are adaptable to river and/or tidal conditions as well. FIGS. 2-4 illustrate such other environments, with FIG. 2 diagrammatically illustrating in plan view a structure utilizing or taking advantage of tide action; FIG. 3 illustrating a system installed in a body of water, for example a river, wherein the flow is substantially or entirely uni-directional, and FIG. 4 illustrating a system particularly adapted to a river environment where tidal conditions also exist.

Referring to FIG. 2, the structure 30 diagrammatically illustrated therein includes side walls 32, 34, 36 and 38. The side walls 32 and 34 merge at their outer ends to an apex 40, and the opposite walls 36 and 38 likewise merge at their outer ends to an apex 42. Cowling means commonly designated at 18 is positioned at the inner end of each curved side wall as described, with each cowling in turn communicating with a separate turbine generator 20.

The longitudinal and transverse curvature of each side wall is preferably identical or similar to the curvature of the side walls 12 and 14 as shown in FIG. 5. It will be apparent that during tidal conditions, water flows first in one direction and then returns in the other, as depicted by arrows at the top and bottom of FIG. 2. Thus, during conditions of high tide, for example, water impinges upon the side walls 36 and 38, increasing velocity in the process, to drive the associated turbine generators 20. The spent water is thereafter directed downstream of the building structure.

During periods approaching low tide, the flow is of course in the opposite direction, with the flow impinging on side walls 32 and 34, with the built-up forces from the water due to their passage along the walls driving the associated turbine generators 20. It is of course assumed that the structure 30 of FIG. 2 would be utilized in an environment where sufficient tide action was present to justify the installation. There may also be present wave action forces where the structure is installed in environments where wave action is normally generated.

The FIG. 2 installation is preferably in an open body of water, and the system can be permanently installed in any suitable manner and with any suitable materials. As above described, the side walls can be coated if desired with a friction-reducing coating to reduce the friction losses occurring as the water impinges on the side walls in both directions of movement of the water. In this manner, the horizontal force component of the water impinging upon the side walls is utilized to a maximum in increasing the velocity of the water as it passes along the side walls, thereby maximizing the output of the turbine generators.

It will be understood that in both the invention forms illustrated in FIGS. 1 and 2, as well as FIGS. 3 and 4 about to be described, the energy produced from the turbine generators can be taken off in any suitable manner. Such electrical energy can be used directly, or indirectly, with an example of indirect utilization being energy used for hydrogen conversion. In any event, utilization of the electrical energy forms no part of the present invention.

Referring to FIG. 3, there is illustrated therein a typical installation utilizing the present invention concepts for use in rivers where the speed of flow is sufficiently ample to produce electrical energy. In the FIG. 3 form, the building structure 50 essentially forms one-half of the double side wall structure shown in FIG. 1, with the side wall 52 communicating at its inner end with cowling means 18 and turbine generator 20. The side wall 52 terminates at its outer end in an apex 54 formed cojointly with the adjusting wall 56 of the structure, with the apex 54 diverting water along the side walls and permitting unimpeded water flow past the adjoining wall 56 of the structure. Again, the longitudinal and transverse curvature of the side wall 52 is preferably identical with or similar to the configuration shown in FIG. 5 thereby producing the increased velocity and thus force as described above.

Referring to FIG. 4, there is illustrated therein a system particularly designed for rivers, tidal areas or other environments where natural currents are present. The system comprises separate structures 60 and 62, with the structure 60 including curved side walls 64 and 66, and the structure 62 having curved walls 68 and 70. Rather than diverting the flow as in the forms previously described, the structures 60 and 62 adjacently disposed as shown in FIG. 4 serve to funnel the incoming water toward the relatively narrow opening between the central curved portions of the structures. At the end of each curved wall in the central region of the system are cowling means commonly designated at 18, and a turbine generator or generators 20 are schematically shown communicating with the outlet ends of the cowling means.

As noted, the FIG. 4 system is particularly adaptable to environments where tidal action is present, and is similar in many respects in this regard to FIG. 2. However, the longitudinally and transversely curved side walls are positioned so as to be converged at their inner ends rather than being diverged as shown in FIG. 2.

It will be understood that the vertical location of the side walls 66 and 70 and will be such as to provide optimum power production, and these walls may be at a position above or below the major extent of the oppositely disposed walls 64 and 68. The same applies of course to the FIG. 2 form of the invention which also is especially designed for use in tidal environment. Where there is a difference in elevation of the walls 66 and 70 relative to the walls 64 and 68, it will be understood that a pair of turbines, superimposed, may be employed, with one turbine servicing the water directed thereto from walls 66 and 70, and the other receiving water at high velocity traveling along the walls 64 and 68.

Although the angle of curvature of the side walls in the several forms described may not be absolutely critical, it would appear that maximum water velocity will be achieved where the longitudinal curvature is parabolic. It is difficult to calculate the overall velocity increase, due to frictional forces and the fact that water, whether in wave form or in simple flow pattern form, contacts the longitudinal side wall along virtually the entire surface of curvature thereof. However, water, traveling in the form of waves, for example, will travel along the length of the curved walls 12 and 14 (FIG. 1) in exactly the same period of time that it would take the wave to travel in a straight path from the apex 16 to a distance generally parallel with the turbine generators 20. Since the flow path along the curved side walls is obviously much longer, for example, 2-3 times as long, the speed or velocity of the water is increased proportionately. For example, if a wave is traveling at 16 feet per second, a typical speed, the water from such wave as it approaches the turbine generators will be traveling approximately 40 feet per second. The transverse curvature of the side walls serves to confine the flow path, with the transverse curvature increasing as the velocity increases so as to preclude or inhibit the water from being diverted away from the surface of the side wall. It has been demonstrated that this combination of longitudinal and transverse curvature of the side walls is of fundamental importance in the present invention.

The potential energy availability of the several forms of the present invention can be calculated without difficulty. It is of course well known that the energy of a moving mass or object is expressed as follows:

$$E = \tfrac{1}{2} m v^2 \tag{1}$$

where E is energy, m is mass, and
v is the velocity of the mass, in this case the velocity of the fluid.

It is also rudimentary that the density (p) of a mass is defined as the amount of the mass in a specific volume, or:

$$p = m/\text{volume} \tag{2}$$

Therefore, if we assume that a moving fluid passes through an opening of a specified size, the volume of the fluid in an assumed or predetermined amount of time would be a product of the cross-sectional area (A) of the opening times the velocity (v) of the fluid times the amount of time (t), or:

$$\text{Volume} = Avt \tag{3}$$

If we substitute equation (3) in equation (2), the resulting equation becomes:

$$p = m/Avt, \text{ or } m = pAvt \tag{4}$$

If we now substitute the equivalency of m as expressed in equation (4) for m in equation (1), the following equation results:

$$E = \tfrac{1}{2}(pAvt)v^2 = \tfrac{1}{2} pAv^3 t, \text{ or } E/t = \tfrac{1}{2} pAv^3 \tag{5}$$

Since the power (P) is defined as energy per unit of time (E/t), $$P = \tfrac{1}{2} pAv^3, \text{ which can also be expressed as} \tag{6}$$

$$P/A = \tfrac{1}{2} pv^3. \tag{7}$$

Based on equation (7), the amount of available energy can be readily calculated based on certain known facts and assumptions. For example, it is known that the density of water between 32° and 50° F. is 1000 Kg/meters (M)$^3$, since 1 cubic centimeter of water weighs one gram. Assuming that the fluid is moving at 30 feet per second through a turbine cowling that is 20 feet in diameter, and assuming 100% efficiency of the turbine, the calculations are as follows:

$$P/A = \tfrac{1}{2} pv^3, \tag{8}$$

where P is power, A is cross-sectional area, p is density and v is velocity of fluid.

Therefore, $$P = \tfrac{1}{2} p A v^3$$

$$P = \tfrac{1}{2} \times \frac{1000 \text{Kg}}{\text{M}^3} \times \left(\frac{9.144 \text{M}}{s}\right)^3 \quad \text{(expressed in metric terms, with "s" designating seconds)}$$

$$= 29.2 \text{M}^2 \times \frac{1000 \text{Kg}}{\text{M}^3} \times \left(\frac{9.144 \text{M}}{s}\right)^3$$

$$= 11{,}162{,}488.4 \ \frac{\text{Kg M}^2}{s^3}$$

Since by definitation 1 watt = 1 joule/sec. and a joule is a Newton meter (1 KgM/s$^2$), $$\begin{aligned} 1 \text{ watt} &= 1 \text{ joule/sec.} \\ &= 1 \text{ Newton meter/sec.} \\ &= 1 \text{ KgM/s}^2 \text{ (M/}s\text{)} \\ &= 1 \text{ KgM}^2/s^3 \end{aligned}$$

Therefore, $$\begin{aligned} P &= 11{,}162{,}488.4 \text{ watts} \\ &= 11{,}162.5 \text{ Kw, the total power available in} \end{aligned}$$

water moving through a 20' diameter cowling and into the turbine generator. To calculate the power available per square meter, the total power is divided by the total area, or:

P/A, expressed in watts 1 square meter $$P/A = \frac{11{,}162{,}488.4 \text{ watts}}{29.2 \text{M}^2}$$

$$\begin{aligned} &= 382.276 \text{ watts per square meter} \\ &= 382 \text{ Kw per square meter} \end{aligned}$$

It will therefore be seen that substantial amounts of electrical energy can be produced in accordance with the present invention. Even assuming a 60% efficiency of the turbine, a turbine having a diameter of 10 feet (approximately 7 square meters) can produce approximately 1.56 megawatts, sufficient to operate approximately 600 homes. In turbines of greater diameter, the energy produced will of course be significantly greater, increasing proportional to the area of the turbine.

I claim:

1. A water power generator for generating electrical energy from a moving body of water, comprising:
   (a) structural means interposed in the path of water flow, said structural means including a first side wall longitudinally curved from a diverting point at the outer end thereof to a gradually flattened curve at the inner end thereof where a vertical plane through the edges of said first side wall is generally more perpendicular to such flow path, with the curvature of said first side wall being continuous from said outer to said inner end thereof, said first side wall also being transversely curved from a generally planar surface at the outer end thereof to a curvature approaching circular at the inner end thereof, and a second side wall the outer end of which merges with the outer end of said first side wall to form an apex, with said second side wall being longitudinally and transversely curved similarly to said first side wall,
   (b) cowling means at the inner end each of said first and second side walls, said cowling means being generally conical in shape, tapering from an enlarged end at the juncture thereof with said side wall to a relatively smaller, opposite end, and
   (c) turbine generator means at said opposite end of each of said cowling means,
   whereby water is diverted by said first and second side walls at said apex, with said water increasing in velocity and thus force as it traverses the longitudinally and transversely curved side walls, with the velocity of the water being further increased during passage through said cowling means prior to reaching said turbine generator means.

2. The water power generator of claim 1 wherein said cowling means comprises a separate cowling member located at the inner end of said first and second side walls, the cross section of said side walls immediately preceding said cowling means being generally circular in cross section and closed, thereby directing the entire water flow to said cowling means.

3. The water generator of claim 2 wherein filter means is associated with each of said cowling members relatively adjacent the outer and inner ends thereof; whereby debris and the like traversing the side walls is filtered out prior to water flow into said turbine generator means.

4. A water power generator for generating electrical energy from a moving body of water, comprising:
   (a) structural means interposed in the path of water flow, said structural means including a first side wall, longitudinally curved from a diverting point at the outer end thereof to a gradually flattened curve at the inner end thereof where a vertical plane through the edges of said first side wall is generally more perpendicular to such flow path, with the curvature of said first side wall being continuous from said outer to said inner end thereof, said first side wall also being transversely curved to a curvature approaching circular at the inner end thereof; a second side wall generally similar in longitudinal and transverse configuration to said first side wall, with the outer end of said second side wall merging with the other end of said first side wall to form an apex for diverting water flow along said first and second side walls, and third and fourth side wall members oppositely positioned on said structure relative to said first and second side walls, the outer, adjacent ends of said third and fourth side walls merging to form an apex for diverting the water flow, with said third and fourth side walls being similarly longitudinally and transversely curved so as to increase the velocity of water flowing along said walls, and
   (b) cowling means and turbine generator means at the inner ends of each of said first, second, third and fourth side walls,
   whereby in a tide environment, water flow during one condition of tide engages said first and second side walls for driving said turbine generator means, and during the other tide condition water flow in the opposite direction contacts said third and fourth side walls for driving said turbine generator means.

5. A water power generator for generating electrical energy from a moving body of water, comprising:

(a) structural means interposed in the path of water flow, said structural means including a first side wall, longitudinally curved from a diverting point at the outer end thereof to a gradually flattened curve at the inner end thereof where a vertical plane through the edges of said wall is generally more perpendicular to such flow path, with the curvature of said wall being continuous from said outer to said inner end thereof, said wall also being transversely curved from a generally planar surface at the outer end thereof to a curvature approaching circular at the inner end thereof; a second side wall having a longitudinal and transverse configuration similar to said first side wall, the spacing and curvature of said first and second side walls being such as to jointly form a generally funnel-shaped opening for receiving water flow, and third and fourth side walls opposite said first and second side walls, with said third and fourth side walls similarly collectively defining a generally funnel-shaped opening for the water flow and being longitudinally and transversely curved as aforesaid, (b) cowling means located at the inner ends of said first, second, third and fourth side walls, and (c) turbine generator means at the outlets of said cowling means, whereby, in a tide environment, water flow is directed along the first and second side walls and through said turbine generator means, and in the opposite tide condition water flow is directed along said third and fourth side walls and through said turbine generator means, thereby deriving electrical energy.

6. The water power generator of claim 5 wherein said structure comprised of said first, second, third and fourth side walls is positioned in a body of water so as to divert a portion of the water flow, with the water not intercepted by said structure flowing unimpeded past the same, thereby especially adapting the structure to use in rivers where tidal conditions exist.

7. The water power generator of claims 4 or 5 wherein said cowling means comprises separate cowling members positioned at the innermost end of each associated side wall, with each side wall immediately in front of each cowling member being generally circular in cross section and closed, and filter means associated with each said cowling member for filtering out debris and the like from the water prior to passage of the same through said turbine generator means.

8. A water power generator for generating electrical energy from a moving body of water, comprising:

(a) structural means interposed in the path of water flow, said structural means including at least one side wall, said side wall being longitudinally curved from a diverting point at the outer end thereof to a gradually flattened curve at the inner end thereof where a vertical plane through the edges of said wall is generally more perpendicular to such flow path, with the curvature of said wall being continuous from said outer to said inner end thereof, said wall also being transversely curved from a generally planar surface at the outer end thereof to a more circular curvature at the inner end thereof, and (b) electrical generator means located at the inner end of said side wall, whereby water is diverted by said side wall at the outer end thereof, with said water increasing in velocity and thus force as it traverses the longitudinally and transversely curved side wall prior to reaching said generator means.

9. The water power generator of claim 8 further including a cowling member located at the inner end of said side wall, the cross section of said side wall immediately preceding said cowling member being generally circular in cross section and closed, thereby directing the entire water flow to said cowling member.

10. The water power generator of claim 8 further including filter means for filtering the water flow prior to entry into said electrical generator means.

11. The water power generator of claim 8 further including a second side wall the outer end of which merges with the outer end of said first side wall to form an apex at the front of said structure, said second side wall being longitudinally and transversely curved similarly to said first recited side wall, and electrical generator means located at the inner end of said second side wall.

12. The water power generator of claim 8 wherein said structure further includes a second side wall generally similar in longitudinal and transverse configuration to said first side wall, with the outer end of said second side wall merging with the outer end of said first side wall to form an apex for diverting water flow along said side wall, and further electrical generator means communicating with an inner end of said second side wall; third and fourth side wall members oppositely positioned on said structure relative to said first and second side walls, the inner ends of said third and fourth side walls merging to form an apex for diverting the water flow, with said third and fourth side walls being similarly longitudinally and transversely curved so as to increase the velocity of water flowing along said walls, and electrical generator means at the inner end of each of said third and fourth side walls, whereby in a tide environment, water flow during one condition of tide engages said first and second side walls for driving the said electrical generator means located at the inner ends of said first and second side walls, and during the other tide condition water flow in the opposite direction contacts said third and fourth side walls for driving said electrical generator means located at the inner end of said third and fourth side walls.

13. The water power generator of claim 8 further including a second side wall having a longitudinal and transverse configuration similar to said first recited side wall, the spacing and curvature of said first and second side walls being such as to jointly form a generally funnel-shaped opening for receiving water flow; third and fourth side wall portions opposite said first and second side walls, with said third and fourth side walls similarly collectively defining a generally funnel-shaped opening for the water flow, and being longitudinally and transversely curved as aforesaid, and electrical generator means associated respectively with said funnel-shaped openings defined by said first and second side walls, and by said third and fourth side walls, whereby, in a tide environment, water flow is directed along the first and second side walls and thereafter through said electrical generator means associated therewith, and in the opposite tide condition water flow is directed along said third and fourth side walls through said electrical generator means associated with said third and fourth side walls.

14. The water power generator of claims 11, 12 or 13 further including filter means located in advance of said electrical generator means for filtering the water flow.

* * * * *